United States Patent [19]
Iwashita

[11] Patent Number: 5,691,616
[45] Date of Patent: Nov. 25, 1997

[54] FULLY-CLOSED-LOOP SERVOMOTOR CONTROL SYSTEM

[75] Inventor: Yasusuke Iwashita, Oshino-mura, Japan

[73] Assignee: Fanuc Ltd., Yamanashi, Japan

[21] Appl. No.: 575,575

[22] Filed: Dec. 20, 1995

[30] Foreign Application Priority Data

Dec. 26, 1994 [JP] Japan ................... 6-336602

[51] Int. Cl.$^6$ ........................................ G05B 11/01
[52] U.S. Cl. ........................... 318/615; 318/568.22
[58] Field of Search ........................ 318/560, 565, 318/568.16–568.18, 568.22, 632, 615, 623, 652

[56] References Cited

U.S. PATENT DOCUMENTS

| | | | |
|---|---|---|---|
| 4,788,482 | 11/1988 | Tachibana et al. | 318/616 |
| 5,049,797 | 9/1991 | Phillips | 318/568.16 |
| 5,418,441 | 5/1995 | Furukawa | 318/568.22 |
| 5,598,077 | 1/1997 | Matsubara et al. | 318/568.22 |

*Primary Examiner*—Brian Sircus
*Attorney, Agent, or Firm*—Staas & Halsey

[57] ABSTRACT

A first integrated position deviation between a move command and an actual position of a servomotor and a second integrated position deviation between the move command and an actual position of a machine moving part are obtained, the difference between the first and second integrated position deviations is smoothed, and a modified move command is created by adding the smoothed difference to the first integrated position deviation and is delivered to a speed loop. When the reversal of rotation of the servomotor is detected, a backlash correction value is added to the first integrated position deviation to update it.

5 Claims, 7 Drawing Sheets

FULLY-CLOSED-LOOP SERVOMOTOR CONTROL SYSTEM

BACKGROUND OF THE INVENTION

1. Field of the Invention

The present invention relates to a fully-closed-loop servomotor control system in which feedback is effected by using a speed detector attached to a servomotor and a position detector attached directly to a machine moving part, such as a table of a machine tool which is driven by means of the servomotor, and more particularly, to a method of preventing a delay in reversal of the moving direction of a machine moving part due to backlash produced when the rotating direction of the servomotor for driving the machine moving part is reversed, by driving the servomotor quickly in the backlash.

2. Description of the Related Art

A fully-closed loop system is generally known as a control system for a servomotor. According to this system, speed loop control is effected in accordance with feedback pulses from a speed detector, such as a pulse coder, attached to the servomotor, while position loop control is carried out in accordance with position feedback signals from a position detector attached to a moving part of a machine which is driven by the servomotor.

Figure 5:
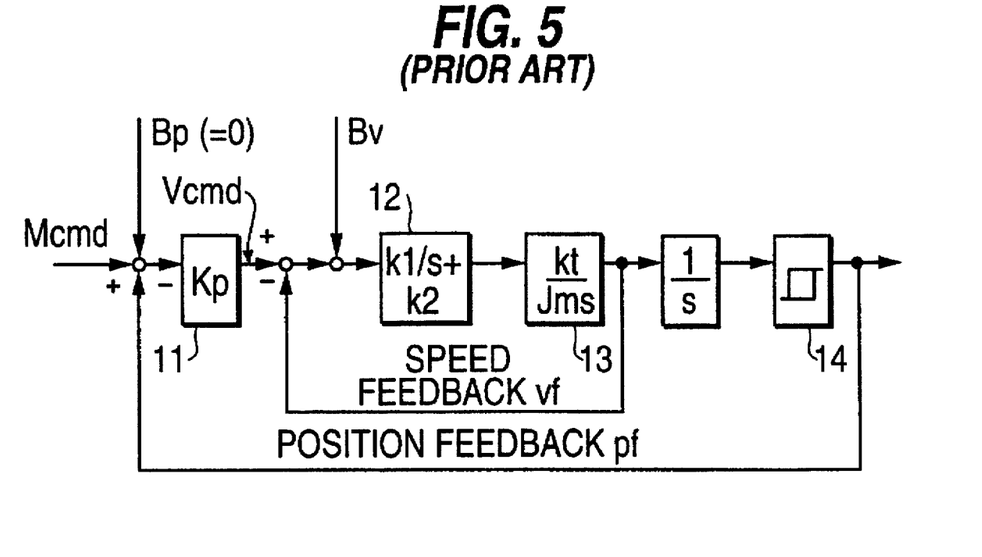
FIG. 5 is a block diagram showing a conventional fully-closed-loop servomotor control system.

Referring now to FIG. 5, the fully-closed loop system will be described. A position deviation is obtained by subtracting a position feedback value pf for each speed loop period T from the position detector, which is attached to a machine moving part 14, from a move command Mcmd which is delivered from a numerical control device at every speed loop period T. A speed command Vcmd is obtained by multiplying the position deviation (Mcmd−pf) by a position loop gain Kp of a position gain block 11.

A speed feedback value Vf from the pulse coder attached to the servomotor is subtracted from the speed command Vcmd, and a torque command (current command) is obtained by subjecting the resulting value to integral-plus-proportional processing (with integral gain k1 and proportional gain k2) in a block 12 for speed loop processing. This torque command is delivered to the motor.

A block 13 is a transfer function of the motor, and Kt and Jm represent a torque constant and an inertia, respectively. A block 14 is a machine drive system which is driven by the servomotor. The servomotor drives a moving part of a machine, such as a table of a machine tool, by means of its feed shaft. Normally, there is a backlash between the feed shaft of the servomotor and the machine moving part. While the machine moving part is being driven in one direction without changing the rotating direction of the servomotor, however, the movement of the machine moving part can follow the rotation of servomotor despite the backlash.

Figure 6A:
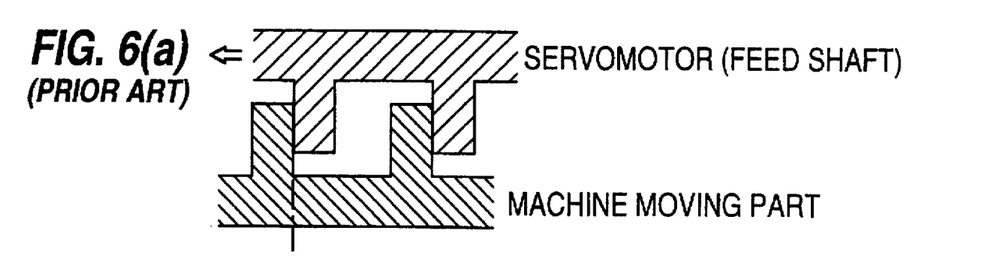
FIGS. 6(a) to 6(c) are diagrams for illustrating the influence of backlash on the drive of a machine moving part.
Figure 6B:
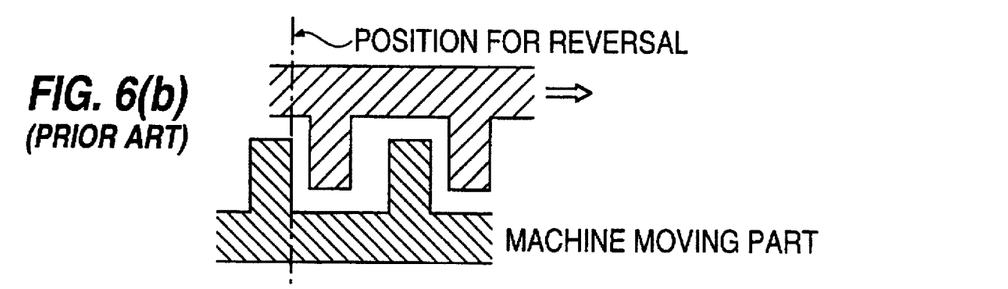
Figure 6C:
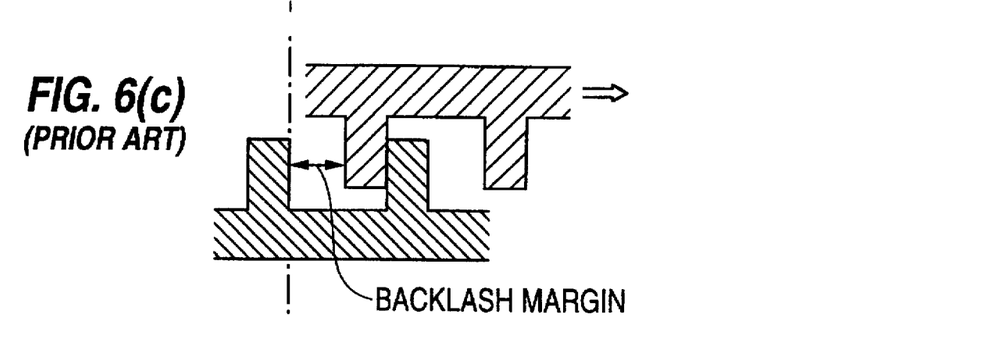

Referring now to FIGS. 6(a) to 6(c), the backlash will be described. When the rotation of the servomotor (more specifically, the feed shaft driven by the servomotor) is reversed in the position shown in FIG. 6(a) after driving the machine moving part, only the servomotor is moved with the moving part at a standstill, immediately after the reversal, as shown in FIG. 6(b). When the servomotor reaches the position shown in FIG. 6(c) after moving for a certain distance, that is, when a distance corresponding to the backlash is covered after the reversal, the servomotor and the machine moving part engage each other. Thereafter, the machine moving part moves following the behavior of the servomotor. While the feed shaft of the servomotor is moving reversely in the backlash of the machine moving part, therefore, it cannot engage and drive the moving part.

Figure 7:
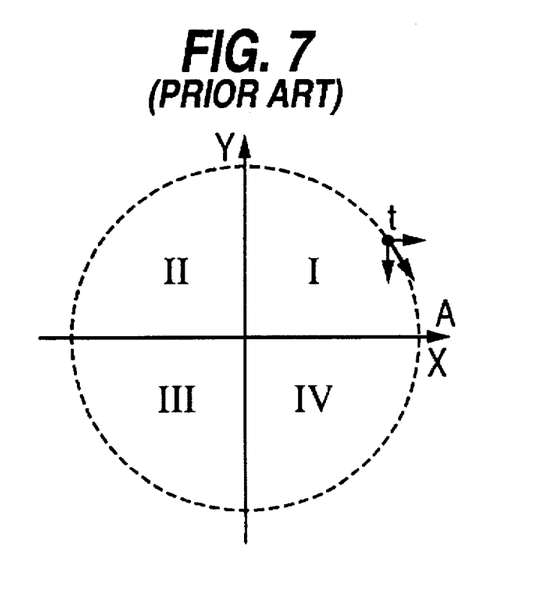
FIG. 7 is a diagram for illustrating the way a tool is driven to move along a circular path on a workpiece by means of two servomotors.

Referring now to FIG. 7, there is shown an XY plane on which a circular arc is described by driving a cutting tool by means of X- and Y-axis servomotors, whereby a workpiece is subjected to arcuate cutting. The circular arc is described along a circle indicated by broken line in FIG. 7, and X and Y axes of the coordinate system cross each other on the center of the circle. Thus, the circle can be divided in four, a first quadrant given by X>0 and Y>0, second quadrant given by X<0 and Y>0, third quadrant given by X<0 and Y<0, and fourth quadrant given by X>0 and Y<0.

Let it be supposed that a tool t moves clockwise from the first quadrant to the second quadrant. The moving direction of the tool at each point is in line with the tangential direction of the circle, and the respective driving speeds of the X- and Y-axis servomotors correspond individually to the X- and Y-axis components of the moving speed of the tool which is represented by a certain length in the tangential direction. The driving direction of the Y-axis servomotor makes no change around a point A at which the circle crosses the X axis in FIG. 7, and the motor speed has its maximum at the point A. On the other hand, the X-axis servomotor reverses its driving direction at the point A, and its rotating speed is reduced to zero at the point A.

Thus, the torque command for the X-axis servomotor has its sign inverted after it becomes very small near the point A, so that the X-axis servomotor cannot immediately reverse its direction due to friction. Owing to the movement in the backlash attributable to the reversal of the X-axis servomotor, moreover, the machine moving part cannot readily follow the reversal of the X-axis servomotor, so that its reverse movement is delayed inevitably. On the other hand, the Y-axis servomotor drives the tool in the negative Y direction at a substantially fixed speed without changing its rotating direction in the vicinity of the point A. Accordingly, the tool t, which is driven by both the X- and Y-axis servomotors, is deviated from the circular path and gets out of the circle immediately after the point A is cleared. When the X-axis servomotor finishes moving in the backlash, the tool returns to the circular path. Thus, a projection is formed on the workpiece just after the point A on the boundary between the quadrants is passed. This projection is referred to as a "quadrant projection."

In the conventional fully-closed-loop servomotor control (see FIG. 5), as mentioned before, the position of the machine moving part is detected directly by means of the detector. Normally, therefore, the position is not subjected to backlash correction (Bp=0). To cope with the production of the quadrant projection, however, a backlash correction value Bv is applied to the speed command.

Figure 8A:
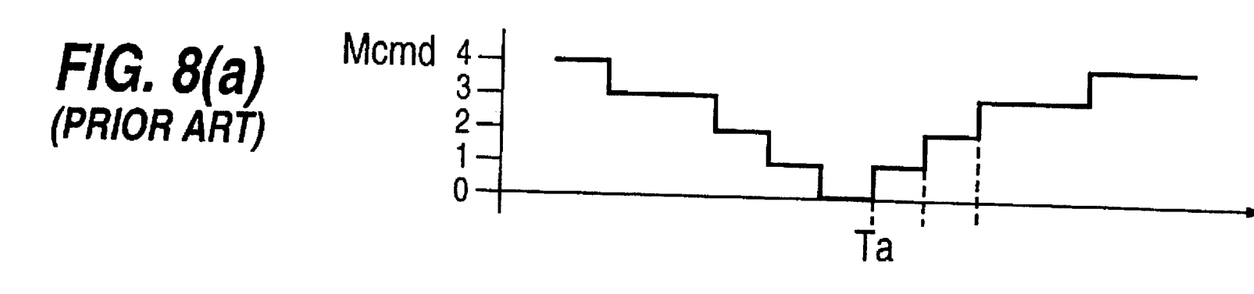
FIGS. 8(a) to 8(c) are timing charts for the conventional fully-closed-loop servomotor control system.
Figure 8B:
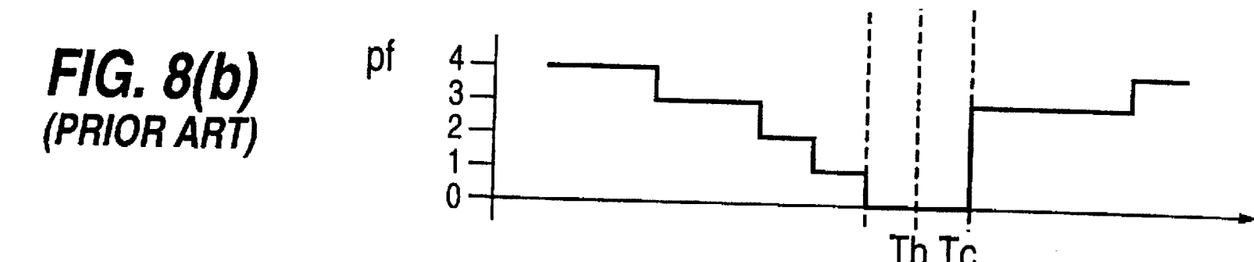
Figure 8C:
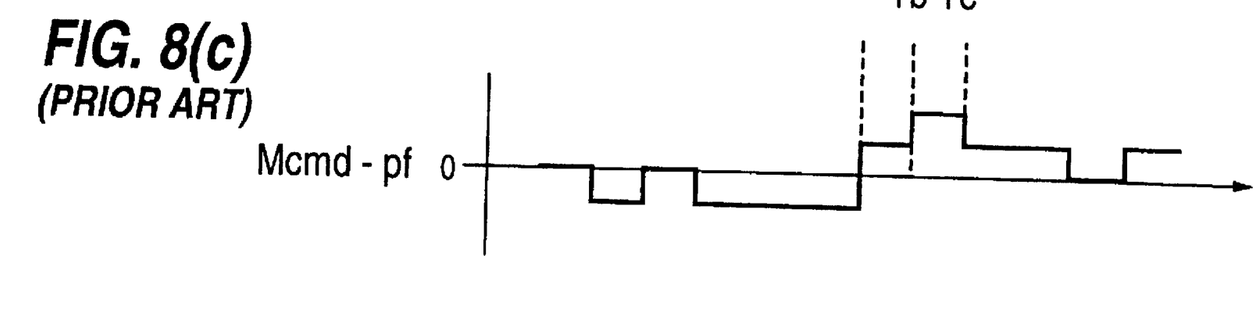

Referring now to the timing charts of FIGS. 8(a) to 8(c), the drive of the machine moving part based on the fully-closed-loop servomotor control shown in FIG. 5 will be described. FIGS. 8(a), 8(b) and 8(c) represent the position command Mcmd, actual position pf of the machine moving part, position deviation (Mcmd−pf), respectively. The direction of the position command Mcmd is reversed at time Ta of FIG. 8(a). Thereupon, the backlash correction value Bv is applied to the block 12 for speed loop processing in FIG. 5. Then, the speed command for the servomotor increases, and the servomotor is moved at high speed in the backlash. Accordingly, the feedback value for the position of the machine moving part at time Tc increases suddenly. In consequence, the time delay of the start of reverse movement of the machine moving part behind the start of reverse rotation of the servomotor is shortened.

In the control system shown in FIG. 5, the backlash correction value Bv for the speed command must be adjusted depending on friction at the machine moving part and a transmission system between the servomotor and the moving part. This value Bv cannot, however, be easily obtained by computation, and actually, is obtained by trial and error.

Practically, therefore, it is difficult to restrain the production of the quadrant projection by using the system of FIG. 5.

OBJECT AND SUMMARY OF THE INVENTION

The object of the present invention is to provide a fully-closed-loop servomotor control system, in which production of a quadrant projection is restrained by correcting a position command for a margin corresponding to a backlash so that a servomotor can be moved quickly and properly in the backlash, instead of applying a backlash correction value to a speed command, as in the conventional case, when the rotating direction of the servomotor is reversed, According to the present invention, a first integrated position deviation between a move command and an actual position of a servomotor and a second integrated position deviation between the move command and an actual position of a machine moving part are obtained, the difference between the first and second integrated position deviations is smoothed, and a modified move command is created by adding the smoothed difference to the first integrated position deviation and is delivered to a speed loop. When the reversal of rotation of the servomotor is detected, a backlash correction value is added to the first integrated position deviation to update it.

According to the fully-closed-loop servomotor control system of the invention, the servomotor can be moved quickly and properly in the backlash when its rotating direction is reversed, so that the production of the quadrant projection can be restrained with accuracy.

BRIEF DESCRIPTION OF THE DRAWINGS

The foregoing an other objects and features of the invention will become apparent from the following description of preferred embodiments of the invention with respect to the accompanying drawings, in which.

DETAILED DESCRIPTION OF THE PREFERRED EMBODIMENT

Figure 1:
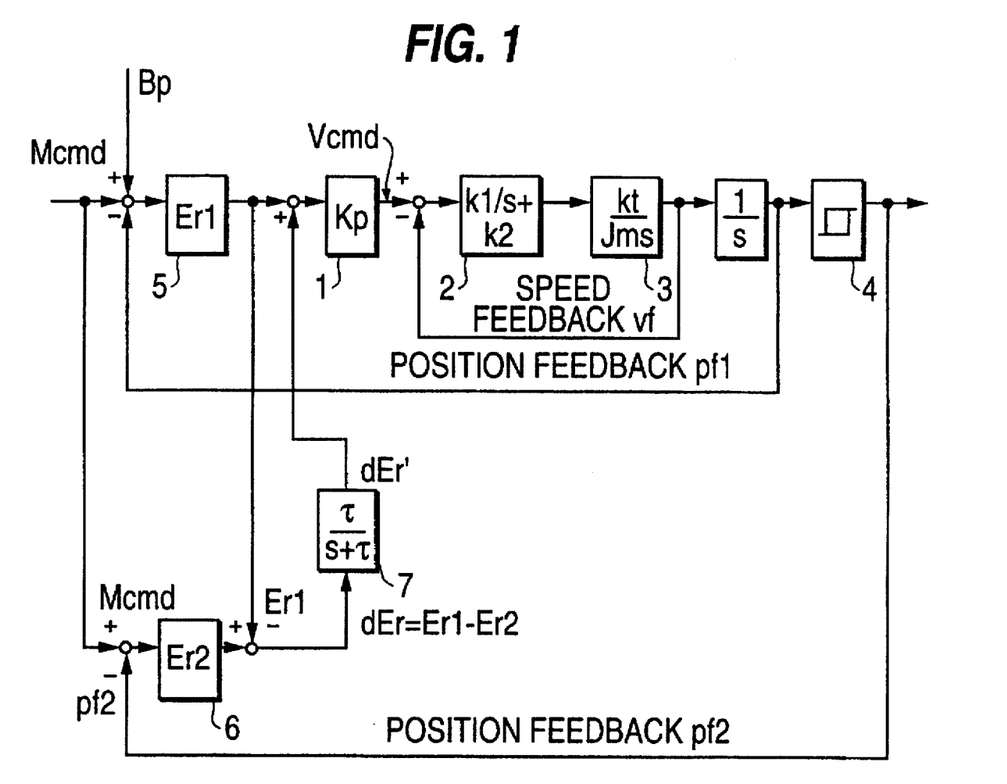
FIG. 1 is a block diagram showing an example of a fully-closed-loop NC servo system used according to the present invention.

FIG. 1 is a block diagram showing a fully-closed-loop NC servo system to which a method according to the present invention is applied. In FIG. 1, a block 1 is a transfer function of a position loop, and Kp represents a position loop gain. A block 2 is a transfer function of a speed loop, and k1 and k2 represent an integral gain and a proportional gain, respectively. A block 3 is a transfer function of a servomotor, and Kt and Jm represent a torque constant and a motor inertia, respectively.

A block 4 is a machine drive system which is driven by the servomotor and includes a backlash margin. Each of machine moving parts, which constitute the machine drive system 4, is fitted with a position detector for detecting the position of the moving part. The detector outputs a position feedback signal pf2 for the machine moving part.

The servomotor is fitted with a pulse coder, which outputs the rotational speed of the servomotor as a speed feedback pulse vf. The speed feedback pulse vf is integrated and outputted as a position feedback pulse which is indicative of a motor position pf1.

A block 5 is a first error counter, which receives a position command Mcmd and the position feedback value pf1 for the servomotor with every position/speed loop processing period, calculates the difference (Mcmd–pf1) between these two values, adds the calculated value to a first position deviation Er1 obtained in the preceding processing period, and outputs the resulting value as the first position deviation Er1 for the present processing period. The first error counter 5 can receive a backlash correction value Bp when the servomotor reverses its rotating direction.

A block 6 is a second error counter, which receives the position command Mcmd and the servomotor position feedback value pf2 for the machine moving part with every position/speed loop processing period, calculates the difference (Mcmd–pf2) between these two values, adds the calculated value to a second position deviation Er2 obtained in the preceding processing period, and outputs the resulting value as the second position deviation Er2 for the processing period concerned.

A block 7 is a smoothing circuit (low-pass filter), which receives outputs from the first and second error counters 5 and 6, smooths the difference dEr (=Er2−Er1) between these outputs, and outputs a smoothed output difference dEr or dEr'. In the case where the signal applied to the input of the smoothing circuit is a digital signal, the smoothed counter output difference dEr' is calculated by using an output dEr(1) for the preceding sampling cycle and an output dEr(0) for the present sampling cycle as follows:

$$dEr'=k*dEr(0)+(k-1)*dEr(1), \qquad (1)$$

where k is a coefficient given by 0<k<1.

The smoothed counter output difference dEr' thus obtained is added to the first deviation Er1 as the output of the first error counter 5, the resulting sum (Er1+dEr') is applied to the transfer function 1 of the position loop, and is multiplied by the position loop gain Kp to provide a speed command Vcmd. A speed deviation (Vcmd−vf) is obtained by subtracting the actual motor speed vf from the speed command Vcmd, and is applied to the transfer function of the speed loop. In this transfer function, the speed deviation is integrated and multiplied by the integral gain k1, and this resulting product is added to the product of the speed deviation and the proportional gain k2 to obtain a torque command (current command). The servomotor is driven in response to the obtained torque command.

If the sign of a move command for the servomotor is inverted, the backlash correction value Bp is applied to the input of the first error counter 5 in synchronism with the reversal of direction. The backlash correction value Bp is a value equivalent to the backlash between the servomotor and the machine moving part, and is read and delivered to the first error counter 5 in synchronism with a command for reversing the servomotor.

When the backlash correction value Bp is applied to the input of the first error counter 5, the sum (Er1+dEr') plus Bp, i.e., (Er1+dEr'+Bp), is applied to the transfer function 1 of the position loop, whereupon the motor move command is increased by a margin corresponding to the backlash correction value Bp.

Figure 2:
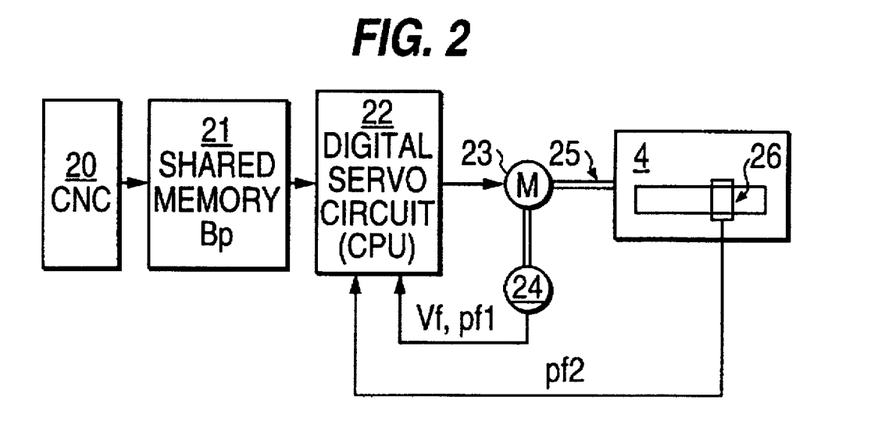
FIG. 2 is a block diagram showing a digital servo circuit for executing control by means of the servo system shown in FIG. 1.

FIG. 2 is a block diagram showing a servo system which carries out the fully-closed-loop servomotor control shown in FIG. 1 by digital servo control. In FIG. 2, a block 20 is a computer numerical control device (CNC) for controlling a machine tool and the like, while a block 21 is a shared memory which delivers the position command Mcmd or the like from the CNC 20 to a digital servo circuit 22 for servo control or delivers a signal from the circuit 22 to the CNC 20. The shared memory 21 is stored in advance with the backlash correction value Bp which is used for quadrant projection correction according to the present invention.

The digital servo circuit 22, which includes a processor (CPU), ROM, RAM, etc., uses its software to process servo circuits for driving servomotors for the machine tool and other moving parts, thereby controlling the servomotors. A block 23 is one of these servomotors, which drives one of the machine moving parts of the machine drive system 4 through the medium of a coupling unit 25, such as a ball screw. The servomotor 23 is fitted with a high-resolution pulse coder 24, which detects the speed of the servomotor 23, delivers it as the speed feedback pulse vf to the digital servo circuit 22, and delivers the motor position pf1 obtained by integrating the speed to the circuit 22.

Each of the machine moving parts of the machine drive system 4 is fitted with a position detector 26 for detecting the moved position of the moving part. The detector 26 detects the position of the moving part and delivers its output pf2 to the digital servo circuit Since the CNC machine tool with the digital servo circuit shown in FIG. 2 is a conventional equipment, a detailed description of its construction is omitted herein.

Figure 3:
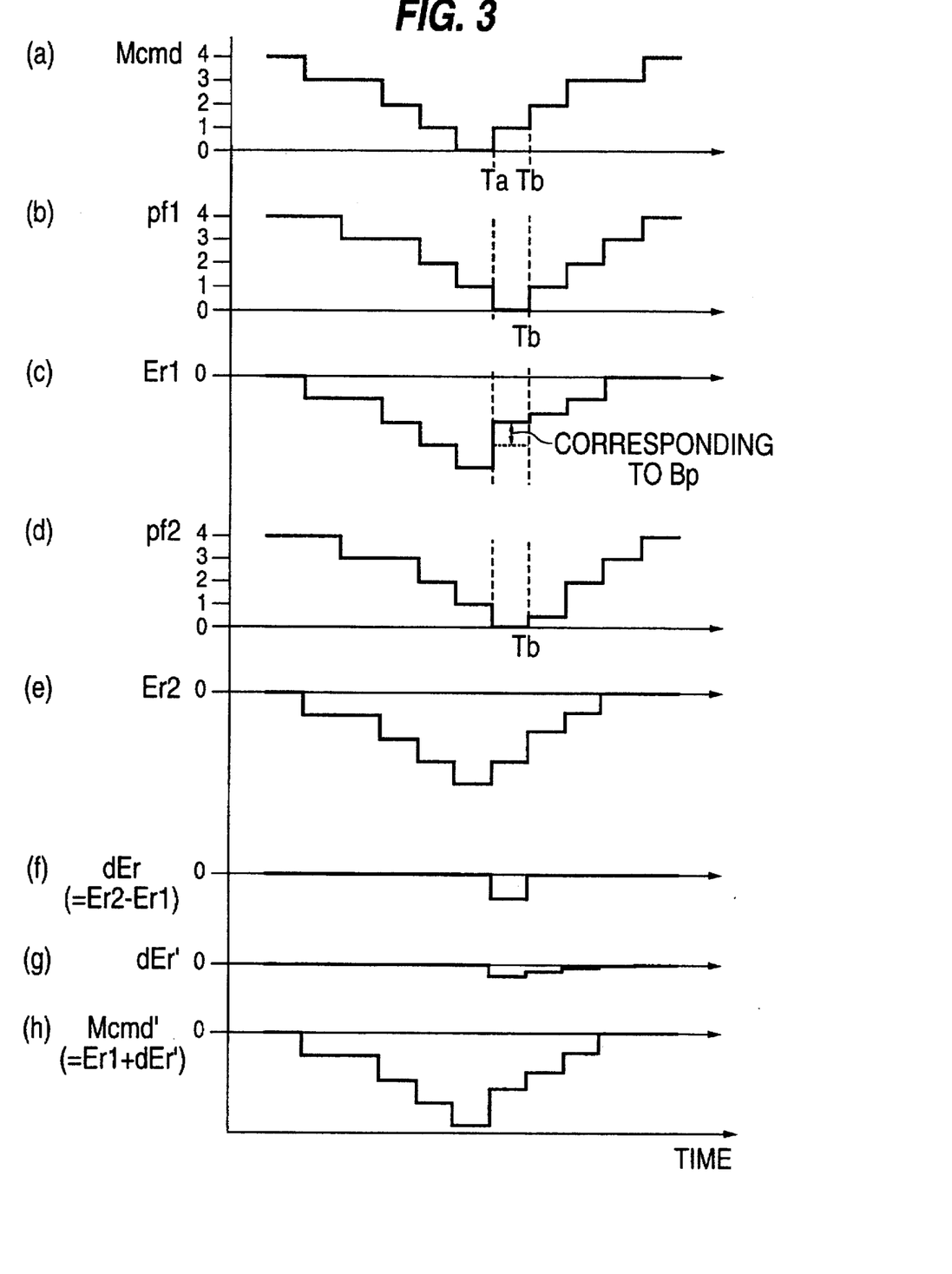
FIG. 3 shows timing charts for feed shaft control according to the invention using the digital servo circuit of FIG. 2.

Referring now to the timing charts of FIGS. 3(a) to 3(h), output models of various elements used for backlash correction by means of the servo system shown in FIG. 1 will be described.

These timing charts are based on the case where the position command Mcmd is gradually reduced from the value "4" and its sign is inverted at time Ta. In this servo system, the outputs pf1 and pf2 for the respective actual positions of the motor and the machine moving part are supposed to be delivered in the same period. It is supposed, moreover, that the backlash between the motor and the machine moving part is greater than the movement of the moving part based on one position command unit.

As the position command Mcmd gradually decreases with the passage of time, the motor is driven in accordance with the sum (Er1+dEr') of the respective outputs of the first error counter 5 and the low-pass filter 7. Before the motor reversal command is delivered, there is no difference between the respective outputs of the first and second error counters 5 and 6 (dEr=0), so that the output Er1 of the first error counter 5 is virtually delivered to the position loop (transfer function 1) to drive the motor.

When the position command Mcmd shifts to 1 in the opposite direction at time Ta after being reduced to 0 just before time Ta, the CPU detects this reversal of direction, reads the backlash correction value Bp previously stored in the shared memory, and delivers it to the first error counter 5. Thereupon, the value Er1 in the first error counter 5 increases by a margin equivalent to the backlash correction value Bp at time Ta, as shown in FIGS. 3(c).

When Er1 thus increases by Bp at time Ta, the movement of the motor increases more at time Tb than in the case where Bp is not given. A dashed line in FIG. 3(b), which represents the actual position pf1 of the motor at time Tb, is indicative of the motor position level reached when the backlash correction value Bp is not given.

As shown in FIG. 3(d) which illustrates the actual position pf2 of the machine moving part, the movement of the machine moving part is not zero at time Tb, and the moving part is already moved for a certain distance in the reverse direction, actually. This is attributable to the fact that the movement of the servomotor is increased by a margin (above the level indicated by the dashed line) corresponding to the backlash correction value Bp at the same time Tb, as shown in FIG. 3(b).

FIG. 3(e) represents the second error counter value obtained when the position command Mcmd, feedback value pf1 for the position of the servomotor, feedback value pf2 for the position of the machine moving part, and predetermined backlash correction value Bp at the time of motor reversal, which are shown in FIGS. 3(a) to 3(d). FIGS. 3(f) to 3(h) represent the difference between the first and second error counter values, the output of the low-pass filter 7, and the command value to be delivered to the position control loop, respectively. As shown in FIG. 3(f), which represents the difference dEr between the first and second error counter values, the backlash correction value Bp is additionally applied to the input of the first error counter at time Ta, so that the output value Er1 of the first error counter increases by Bp. Accordingly, a difference equivalent to Bp is produced between the respective output values of the first and second error counters, having so far been equal to each other, so that dEr=Er2−Er1=−Bp is given.

As described above, the machine moving part is controlled by means of the servo system shown in FIG. 1, and the backlash correction value Bp is applied when the rotating direction of the servomotor is reversed (at time Ta). Thereupon, the movement of the servomotor per unit time (i.e., moving speed) actually increases by a margin corresponding to the backlash correction value Bp at time Tb immediately after time Ta, so that the machine moving part starts to move reversely by time Tb.

If the backlash correction value Bp is not applied at time Ta, the moving speed of the motor will not increase just after that time. At time Tb, therefore, the motor will be still moving in the backlash, so that the reversal of the machine moving part will not be started yet.

The compensation of this backlash can prevent a phenomenon such that the machine tool normally cannot be reversed at once, owing to the influence of the backlash of the feed shaft or friction, when the driving direction of the servomotor for driving a table or the like is reversed, and that a projection is formed on an arcuate cut surface when the quadrant changes while the machine tool is being operated for arcuate cutting.

Figure 4:
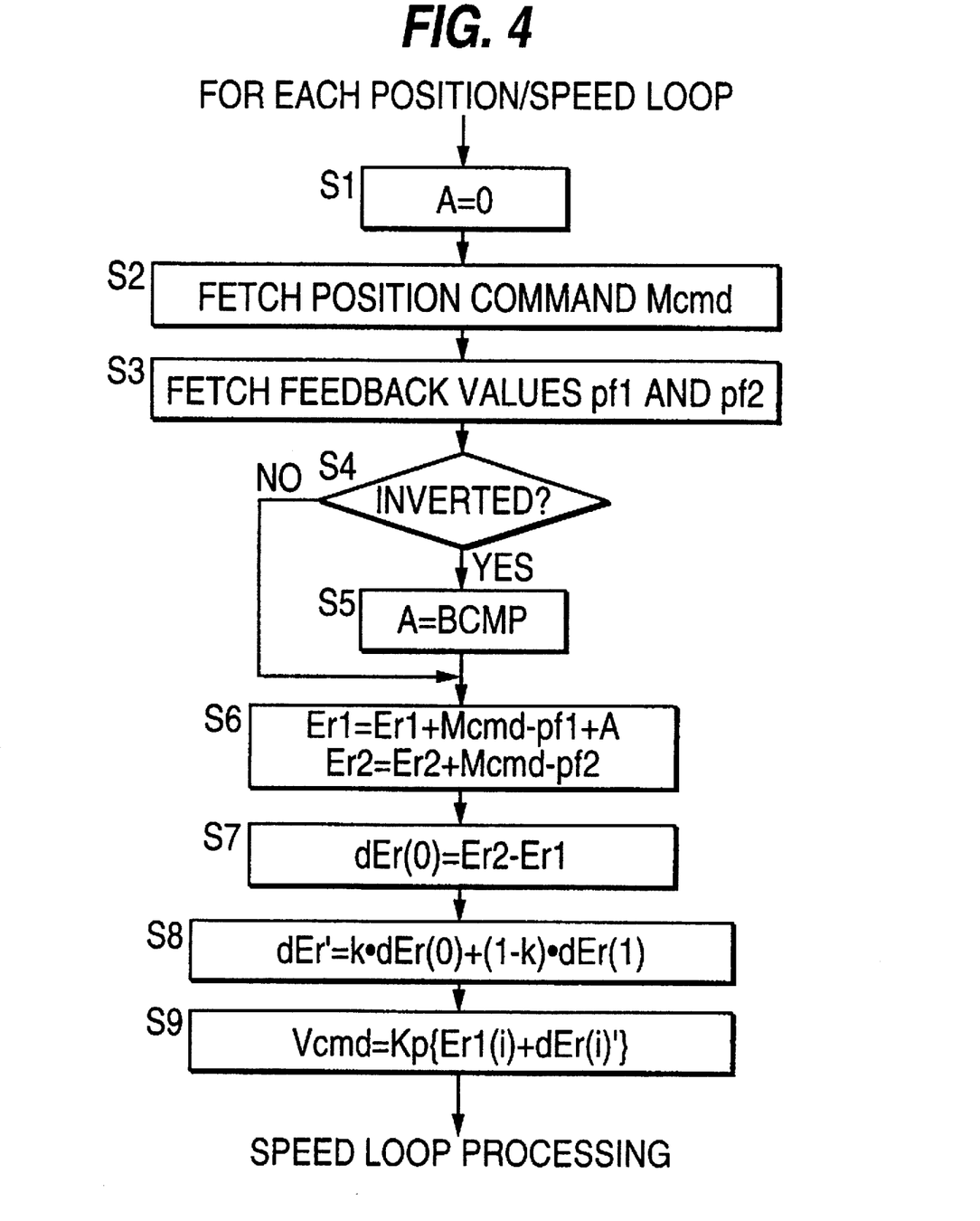
FIG. 4 is a flowchart for illustrating CPU processing based on the feed shaft control according to the invention using the digital servo circuit of FIG. 2.

FIG. 4 is a flowchart showing processes the processor (CPU) of the digital servo circuit 22 shown in FIG. 2 executes at every position/speed loop processing period.

The CPU first sets the value in a register A, storing the backlash correction value Bp, at zero (Step S1), and then fetches the position command Mcmd for unit time (Step S2). Further, the CPU fetches the feedback value pf1 for the motor position and the position feedback value pf2 from the position detector attached to the machine moving part (Step S3). Each of the feedback values pf1 and pf2 is a movement per unit time.

Then, the CPU determines whether or not the sign of the position command Mcmd is inverted (Step S4). If no inversion of the sign of Mcmd is detected, the first and second deviations Er1 and Er2 are computed without changing the value in the register A which stores the backlash correction value Bp (Step S6). If the inversion of the sign of the Mcmd is detected, the value in the register A is rewritten for the backlash correction value Bp previously stored in the shared memory 21, and the first and second deviations Er1 and Er2 are computed individually.

The first deviation Er1 is obtained by subtracting the feedback value pf1 for the position of the motor fetched in Step S3 from the sum (Er1+Mcmd+A) of the first deviation Er1 obtained in the preceding processing period, the position command Mcmd fetched in Step S2 and the value stored in the register A. On the other hand, the second deviation Er2 is obtained by subtracting the feedback value pf2 for the position of the machine moving part fetched in Step S3 from the sum (Er2+Mcmd) of the second deviation Er2 obtained in the preceding processing period and the position command Mcmd fetched in Step S2

After computing the first and second deviations Er1 and Er2, the CPU first obtains the difference dEr(0) between these two values (Step 87), and then smooths the difference dEr(0) according to equation (1) on the basis of the difference dEr(1) between the first and second deviations Er1 and Er2, obtained in like manner in the preceding processing period, and the predetermined coefficient k, thereby computing the correction value dEr' (Step S8). Subsequently, the speed command Vcmd is obtained by multiplying the sum of the first deviation Er1 obtained in Step S6 and the correction value dEr' by the position loop gain Kp (Step S9). The obtained speed command Vcmd is delivered to the speed control loop.

Figure 9A:
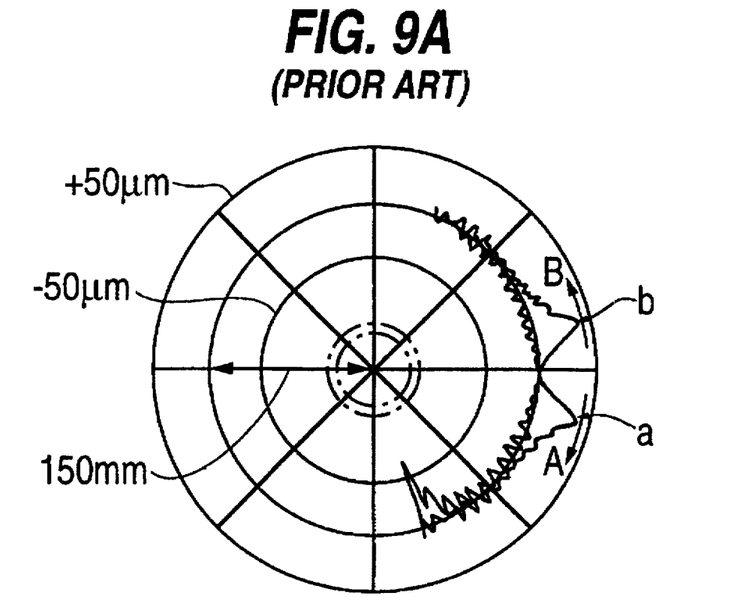
FIG. 9A is a diagram showing a moving path of a tool according to a conventional method.

FIG. 9A shows the cutting accuracy of a cut surface on which a circular arc of 15-mm radius is cut at the speed of 500 mm/min. by the conventional method in which no backlash correction value is given to the position command. In FIG. 9A, results for cutting directions indicated by arrows A and B are illustrated overlapping each other. As seen from this drawing, quadrant projections designated by a and b are produced by the cutting operations in the directions of arrows A and B, respectively. In FIG. 9A, each graduation in the radial direction represents a length of 50 μm.

Figure 9B:
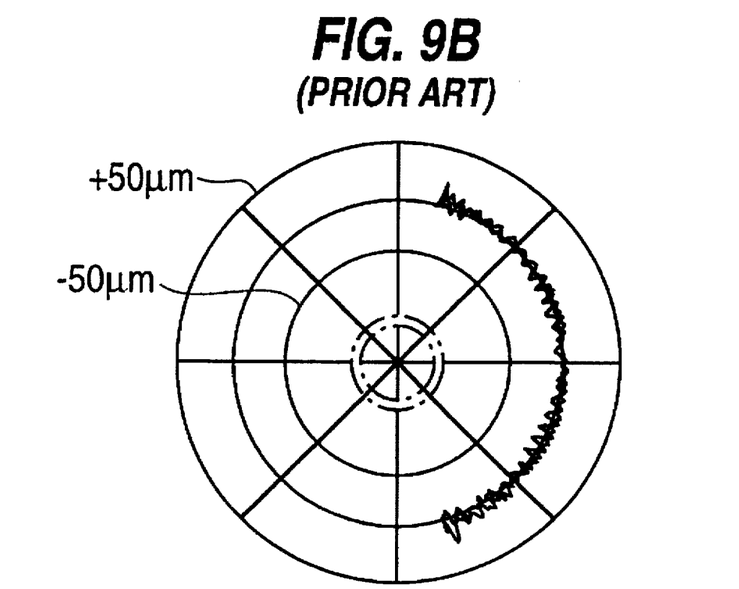
FIG. 9B is a diagram showing a moving path of a tool according to a method of the present invention.

FIG. 9B shows the cutting accuracy of a cut surface on which a circular arc of 15-mm radius is cut at the speed of 500 mm/min. by the method according to the present invention in which the backlash correction value Bp is given to the position command. In FIG. 9B, results for one cutting direction and another direction opposite thereto are illustrated overlapping each other. According to the method of the invention, as seen from this drawing, hardly any quadrant projections are developed.

What is claimed is:

1. A fully-closed-loop servomotor control method comprising steps of:

adding the difference between a move command and an actual position of a servomotor to a value in a first error counter at every predetermined processing period;

adding the difference between the move command and an actual position of a machine moving part driven by means of the servomotor to a value in a second error counter at every said processing period;

obtaining the difference between the respective output values of the first and second error counters and smoothing the difference to obtain an error counter difference;

obtaining a speed command by multiplying the sum of the error counter difference and the first position deviation by a predetermined position loop gain;

delivering the difference between the speed command and the actual speed of the servomotor to a speed control loop; and additionally applying a predetermined correction value for backlash correction to the input of the first error counter when the rotating direction of the servomotor is reversed.

2. A fully-closed-loop servomotor control method according to claim 1, wherein said reversal of direction of said servomotor is discriminated by the inversion of the sign of a position command for the servomotor.

3. A fully-closed-loop servomotor control method according to claim 1, wherein said difference between the respective output values of said first and second error counters is smoothed into a value equal to the sum of the product of the error counter difference obtained in the present processing period and a predetermined coefficient k (0<k<1) and the product of the error counter difference obtained in the preceding processing period and (k−1) in the case where the servo system is processed by means of a digital signal.

4. A fully-closed-loop servomotor control method according to claim 1, wherein said predetermined correction value for backlash correction is settled in accordance with the backlash between a feed shaft driven by the servomotor and the machine moving part driven by the feed shaft.

5. A fully-closed-loop NC servo system comprising:

a first error counter which receives a move command from a numerical control device, a feedback value for the position of a servomotor, and a predetermined move command correction value for backlash correction, to obtain a computation result by subtracting the feedback value for the position of the servomotor from the sum of the move command and the move command correction value, and accumulates the computation result for outputting;

a second error counter which receives the move command and a feedback value for the position of a machine moving part driven by means of the servomotor, to obtain a computation result by subtracting the feedback value for the position of the machine moving part from the move command, and accumulates the computation result for outputting;

error counter difference computing means which receives the respective output values of the first and second error counters, to obtain a computation result by subtracting the output value of the second error counter from the output value of the first error counter, and carries out smoothing processings for the computation result for outputting;

adder means which receives the respective outputs of the first error counter and the error counter difference computing means to obtain the sum of the two outputs, and delivers the obtained sum to a speed control loop; and backlash correcting means which determines whether or not the sign of the move command is inverted and changes the predetermined move command correction value for backlash correction from zero to a predetermined value in accordance with the backlash between the servomotor and the machine moving part, when an inversion of the sign is detected.

* * * * *